US007298065B2

(12) United States Patent
Lau

(10) Patent No.: US 7,298,065 B2
(45) Date of Patent: Nov. 20, 2007

(54) BRUSH ASSEMBLY

(75) Inventor: James Ching Sik Lau, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 165 days.

(21) Appl. No.: 11/116,366

(22) Filed: Apr. 28, 2005

(65) Prior Publication Data

US 2005/0242683 A1    Nov. 3, 2005

(30) Foreign Application Priority Data

Apr. 30, 2004  (GB) ................. 0409662.4

(51) Int. Cl.
*H01R 39/38* (2006.01)
(52) U.S. Cl. ..................... 310/242; 310/245
(58) Field of Classification Search .......... 310/71, 310/239, 242, 245–247, 240
See application file for complete search history.

(56) References Cited

U.S. PATENT DOCUMENTS

| | | | | |
|---|---|---|---|---|
| 2,194,620 A | * | 3/1940 | Sekyra | 310/247 |
| 2,358,958 A | * | 9/1944 | Brown | 310/249 |
| 3,710,160 A | | 1/1973 | Voglesonger | |
| 3,983,432 A | * | 9/1976 | Rankin | 310/242 |
| 4,112,321 A | * | 9/1978 | Wan | 310/242 |
| 4,354,128 A | * | 10/1982 | Chew et al. | 310/242 |
| 4,559,465 A | | 12/1985 | Gagneux | |
| 6,144,134 A | | 11/2000 | Lin | |

FOREIGN PATENT DOCUMENTS

| | | |
|---|---|---|
| EP | 0482235 A1 | 4/1992 |
| EP | 0935318 A2 | 8/1999 |
| GB | 774616 A | 5/1957 |
| GB | 2302999 A | 5/1997 |
| JP | 61088743 A | 10/1984 |
| WO | WO-03/107517 A1 | 12/2003 |

* cited by examiner

*Primary Examiner*—Dang Le
(74) *Attorney, Agent, or Firm*—Birch, Stewart, Kolasch & Birch, LLP

(57) ABSTRACT

A brush assembly 22 for an electric motor 10 has brush holder 24 supporting a brush 26 and a brush spring. The brush holder 24 has a strip of brass having a central portion and two end portions 28, 40. The central portion has two pins 30 extending in a parallel fashion away from the central portion. A brush 26 has two grooves 64 which mate with and accommodate the pins 30 whereby the pins 30 support the brush 26 and prevent movement of the brush 26 except in the direction along the pins 20. The brush spring is a coil spring mounted on a post 54 formed at one end of the strip by a transverse slot 52 and bears on the back side of the brush 26 to urge it to slide along the pins away from the brush holder 24.

44 Claims, 7 Drawing Sheets

BRUSH ASSEMBLY

This invention relates to electric motors and in particular, to a brush holder assembly, for use with electric motors or the like.

Brush assemblies for electric motors, especially small permanent magnet DC motors, are either cage brush assemblies or leaf brush assemblies. Leaf brushes are relatively inexpensive comprising essentially of an elongate cantilevered strip of resilient conductive material, typically beryllium copper, which is resiliently deformed against a rubbing contact surface of a commutator. A carbon based brush head may be attached to the distal end of the brush arm to make contact with the rubbing surface. Cage brush assemblies use a carbon based brush which is pressed against the commutator by a separate spring and guided towards the commutator by a rigid tube or cage usually of brass or an insulating plastic material. This is more stable and hence, more desirable but is also more expensive and harder to cool the brush.

Hence, there is a desire for a stable brush assembly which is easy to cool yet inexpensive to manufacture.

Accordingly, the present invention provides a brush assembly for an electric motor, the brush assembly comprising: a brush for making sliding contact with a commutator; a spring for resiliently urging the brush into contact with the commutator; a holder for supporting the brush and guiding the brush towards the commutator, the holder having a base and a plurality of projections extending from the base for supporting and guiding the brush, wherein the projections form rails and the brush has a plurality of grooves in which the rails are received for guiding and supporting the brush.

Preferably, there are two projections of circular cross section and the grooves in the brush are part-circular in cross section.

Preferably, the brush assembly is adapted to be releasably attached to a brush plate of the motor.

Preferably, the base and the projections are integrally formed as a monolithic construction and the projections form rails cantilevering from the holder and the brush is adapted to slide along the rails under the influence of the spring.

Preferably, the two projections are respective ends of a single rod and the rod has a substantially U-shaped middle portion forming a bottom with two arms extending therefrom.

Preferably, the bottom is securely received in a recess in a brush plate of the motor.

Preferably, the arms are U-shaped forming first and second arm portions which extend substantially perpendicularly from the base with the brush slidable along the projections being the free ends of the second portions of the arms and being proximate to the first portion of the arms and the bottom.

Preferably, the brush has a stop projection located between the first portion of the arms and interfering with the bottom to limit movement of the brush away from the base.

Alternatively, the projections are separate U-shaped rods extending from respective first and second bases located on opposite lateral sides of the brush.

The present invention also provides an electric motor incorporating such a brush assembly.

Four preferred embodiments of the invention will now be described, by way of example only, with reference to the accompanying drawings, in which.

Figure 1:
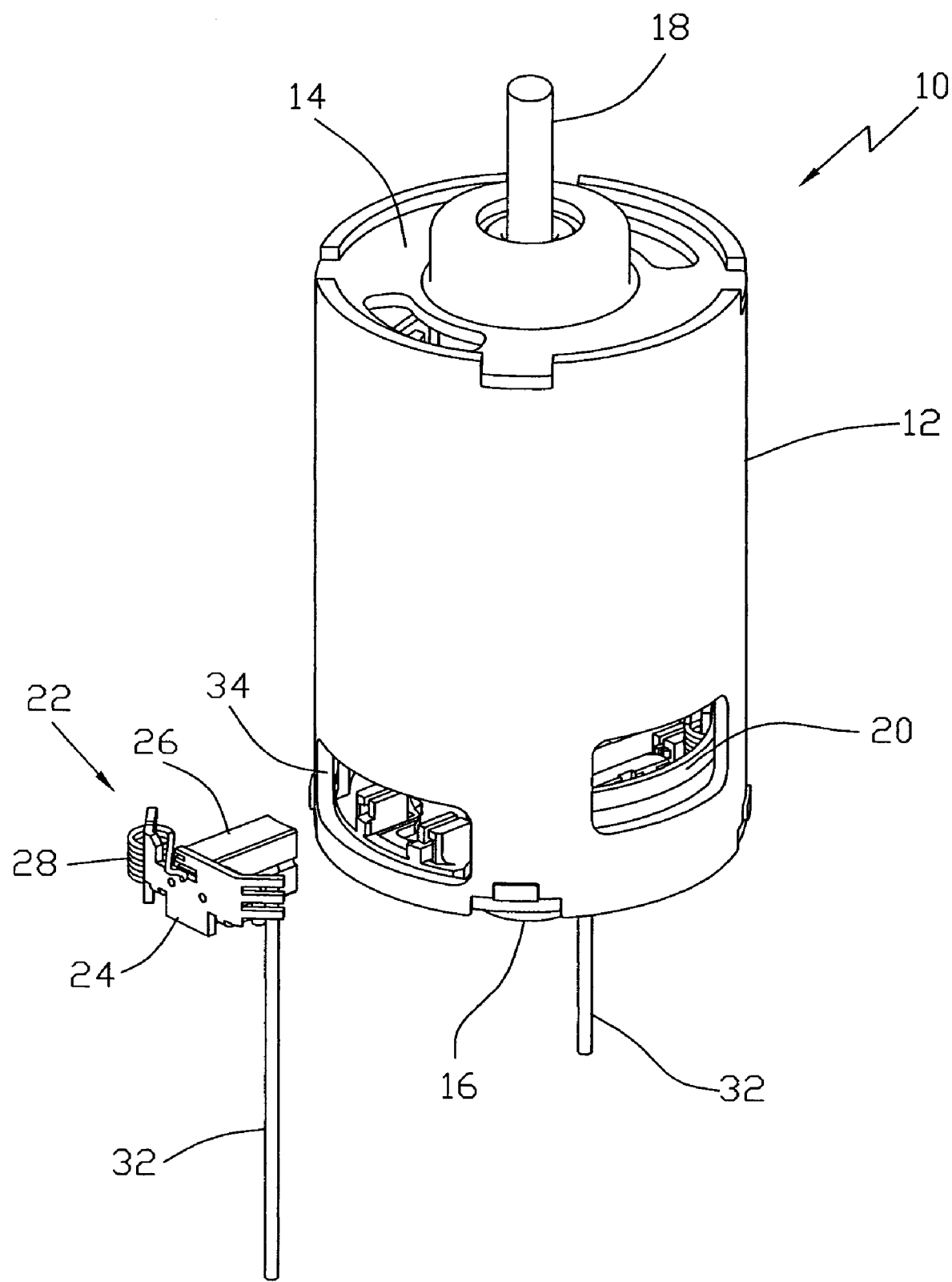
FIG. 1 is a partially exploded view of a motor incorporating a brush assembly according to the present invention.

The motor of FIG. 1 is a small PMDC motor suitable for high current, high power applications such as a portable hand held drill. The motor 10 has a housing formed by a rear housing 12 and a first end cap 14 and a second end cap 16. The motor has a shaft 18 which can be seen extending through end cap 14. The shaft is part of a wound rotor which includes a commutator and the rear housing 12 supports a permanent magnet stator.

End cap 16 comprises two parts, a metal outer plate and a plastic inner plate known as brush plate 20 as it supports the brush gear and other electrical components including motor terminals, where used.

In this motor, the brush gear comprises two brush assemblies. One brush assembly 22 is shown exploded from the rest of the motor as it is a replaceable brush assembly meaning that the brush assembly can be replaced, if need be, (for example, if worn out or damaged) without disassembling the motor housing. The brush assembly is shown ready to be fitted to the brush plate by mounting it through a window 34 in the rear housing 12.

The brush assembly 22 comprises a brush holder 24, a brush 26, and a brush spring 28. The brush holder 24 is shown in greater detail in FIG. 2. The brush holder has a base 25 in the form of a stamped strip 36 of zinc plated steel sheet although other materials may be suitable such as brass sheet. The strip 36 has ends 38, 40 bent or curved inwardly to roughly follow the contour of the rear housing. It has two mounting arms 42 which extend from a lower edge which are bent to extend inwardly horizontally. Each arm 42 has a barb 44 with a tapered face and an opposing rear shoulder 46. A longitudinal slot 48 in the distal end of the arm 42 allows the barb 44 to be readily resiliently squeezed compared with the remaining part of the arm. The barb 44 or tapered face and shoulder provide a snap fit function as will be described later.

The brush holder 24 has two projections formed by two pins 30 pressed fitted into two holes in the central portion of the strip 36. The pins 30 extend perpendicular to the central portion and project inwardly substantially parallel to the arms 42. The pins 30 form rails along which the brush 26 is slidingly guided into contact with a commutator.

Figure 2:
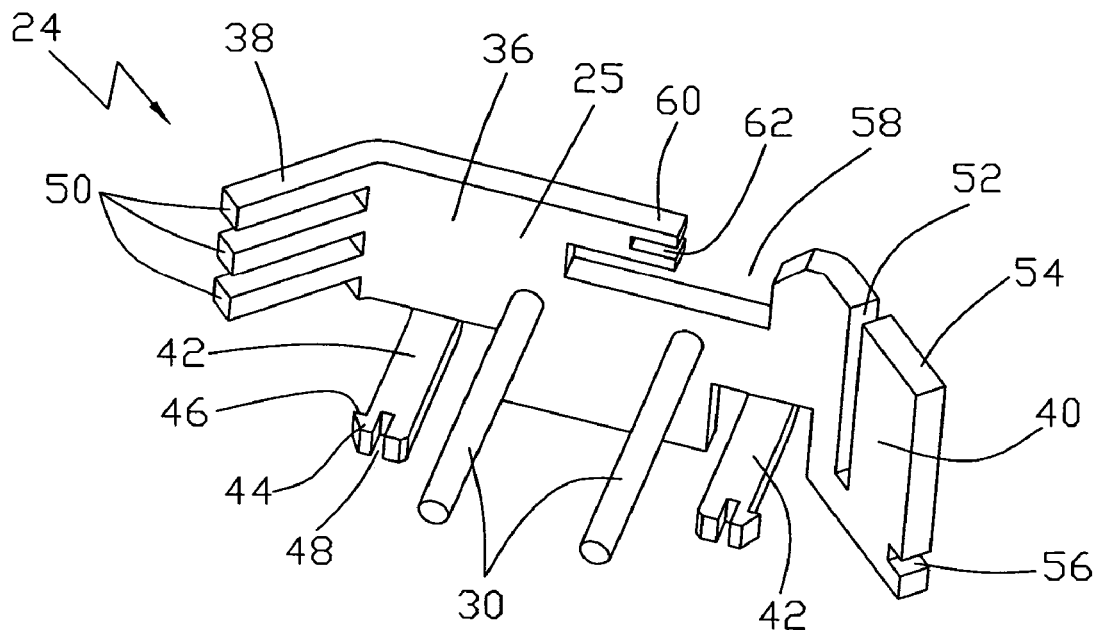
FIG. 2 illustrates a brush holder, being a part of the brush assembly of FIG. 1.

One end 38 of the brush holder strip 36 (left hand end as shown in FIG. 2) has two longitudinally extending slots forming three fingers 50. The other end 40 of the strip 36 has a transverse slot 52 forming a squarish projection 54 with a small notch 56 formed in the end edge of the strip 36. This projection 54 forms a holder or mount for the brush spring 28 and the notch 56 forms a spring seat in which an end of the spring is trapped. The other end of the spring is arranged to bear against the back of the brush to push it away from the brush holder 24, in a sliding action along the pins 30. A cut-out 58 in the central portion of the brush holder strip 36 provides access to the brush for the spring. A limb 60 extending partially across the cut-out 58, and having a slotted end 62, provides a handy rest for the brush end of the spring during assembly.

Figure 3:
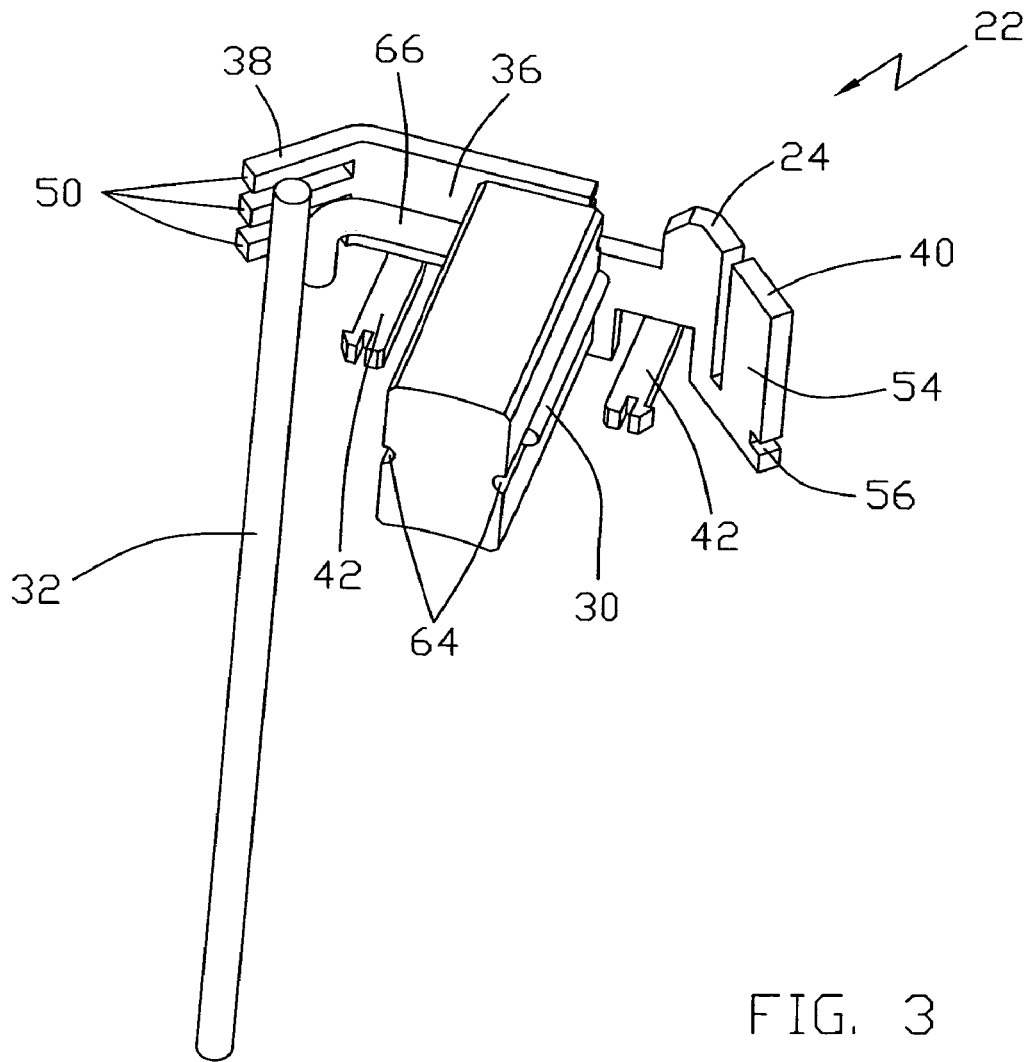
FIG. 3 illustrates the brush holder of FIG. 2 with a brush and lead wire attached.
Figure 4:
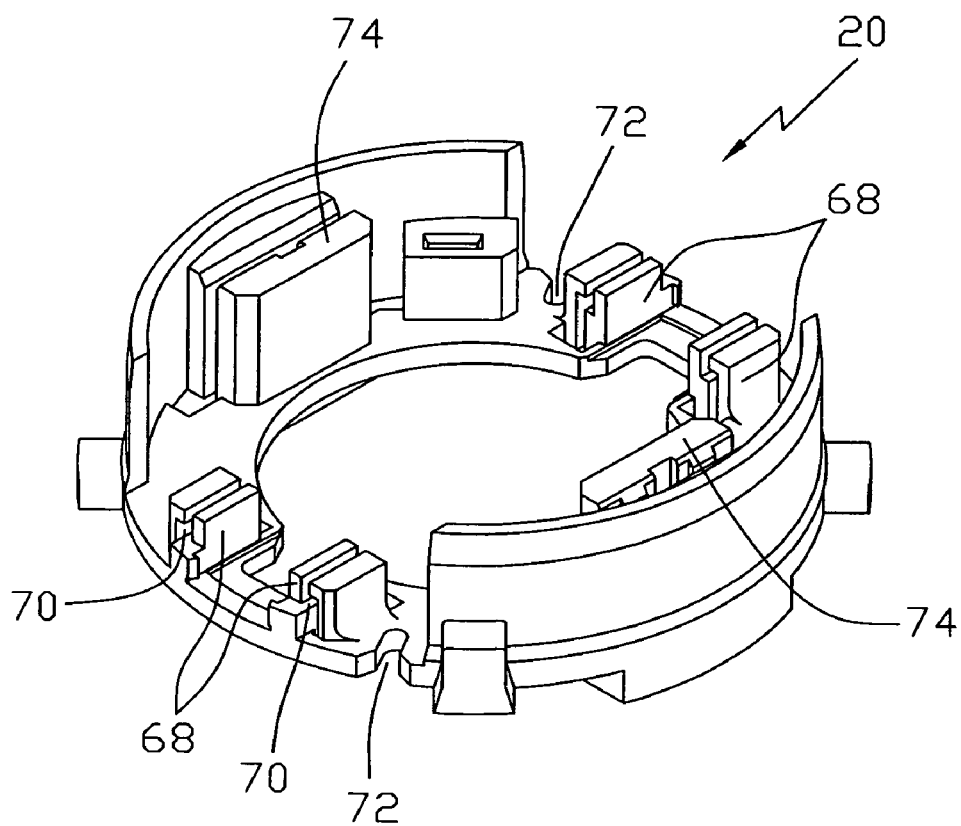
FIG. 4 illustrates a brush plate being a part of an end cap of the motor of FIG. 1.
Figure 5:
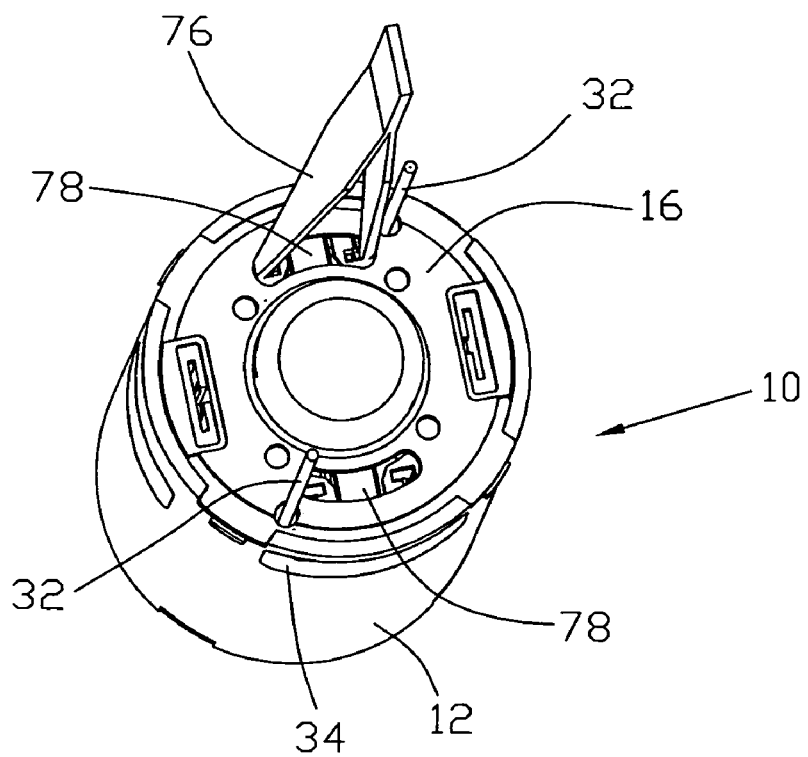
FIG. 5 is a schematic representation of a method of removing the brush assembly of the motor of FIG. 1.

FIG. 3 shows the brush holder 24 with a brush 26 fitted and a terminal wire 32 attached. The brush 26 has two part circular grooves 64, running axially along the longer sides. The pins 30 locate within the grooves 64 such that the brush 26 is smoothly slidable along the pins 30. The brush 26 also has an embedded shunt wire 66 which extends laterally of the brush 26 and is electrically attached to the brush holder 24 by being welded to one or more of the three fingers 50. A motor terminal wire 32 is also welded or otherwise electrically attached to one or more of the three fingers 50, for connecting the brush 26 to an external source of power.

As mentioned previously, input end cap 16 has a metal cover supporting a bushing for the shaft 18 and a plastic material brush plate 20, coupled to the metal cover. The brush plate 20 has mounts 60 for fixing the brush assemblies 22 to the end cap 16. Each mount 68 comprises a pair of projections forming a tunnel 70 in which the mounting arms 42 of the brush holder 24 are a press fit. The barbs 44 are resiliently deformed as the arms 42 are pressed into the tunnels 70 and spring back when they clear the end of the tunnels 70 as the brush holder 24 is pressed into the fully inserted position. The shoulders 46 bear against the end walls of the outer tunnel projections preventing removal of the brush holder 24. A slot 72 is located in the brush plate 20 adjacent the terminal fingers 50 for passage of the terminal lead 32.

This construction particularly favors the use of terminal leads 32. However, the brush holder 24 can be connected to motor terminals which would be fitted to motor terminal holders shown as projections 74 on the brush plate 20 The connection can be made by using a wire, brass strip or an extension of the motor terminal to connect to the brush holder, preferably by welding or a resilient connection.

To release the brush holder 24 from the brush plate 20, for example, to replace the brush assembly, prongs of a tweezer-like tool 76 are inserted into a recess 78 in the end cap 16 which exposes the distal ends of the mounting arms 42 and pressed against the barbs 44 to resiliently bend the shoulders 46 away from the wall at the end of the tunnel 70 allowing the mounting arms 42 to be withdrawn from the tunnel 70 and the brush assembly 24 to be withdrawn from the motor 10 through the window 34.

The pin-like projections or rails 30 provide the brush 26 with a very stable brush position similar to a cage brush assembly as movement of the brush 26 is prevented by the rails 30 within the grooves 64 in all directions except axially along the rails 30. At the same time, the brushes 26 are fully exposed except for the small area of the projections 30 and thus, this brush assembly 22 has the stability of a cage brush assembly with the exposure and thus, the coolability of a leaf brush assembly.

Figure 6:
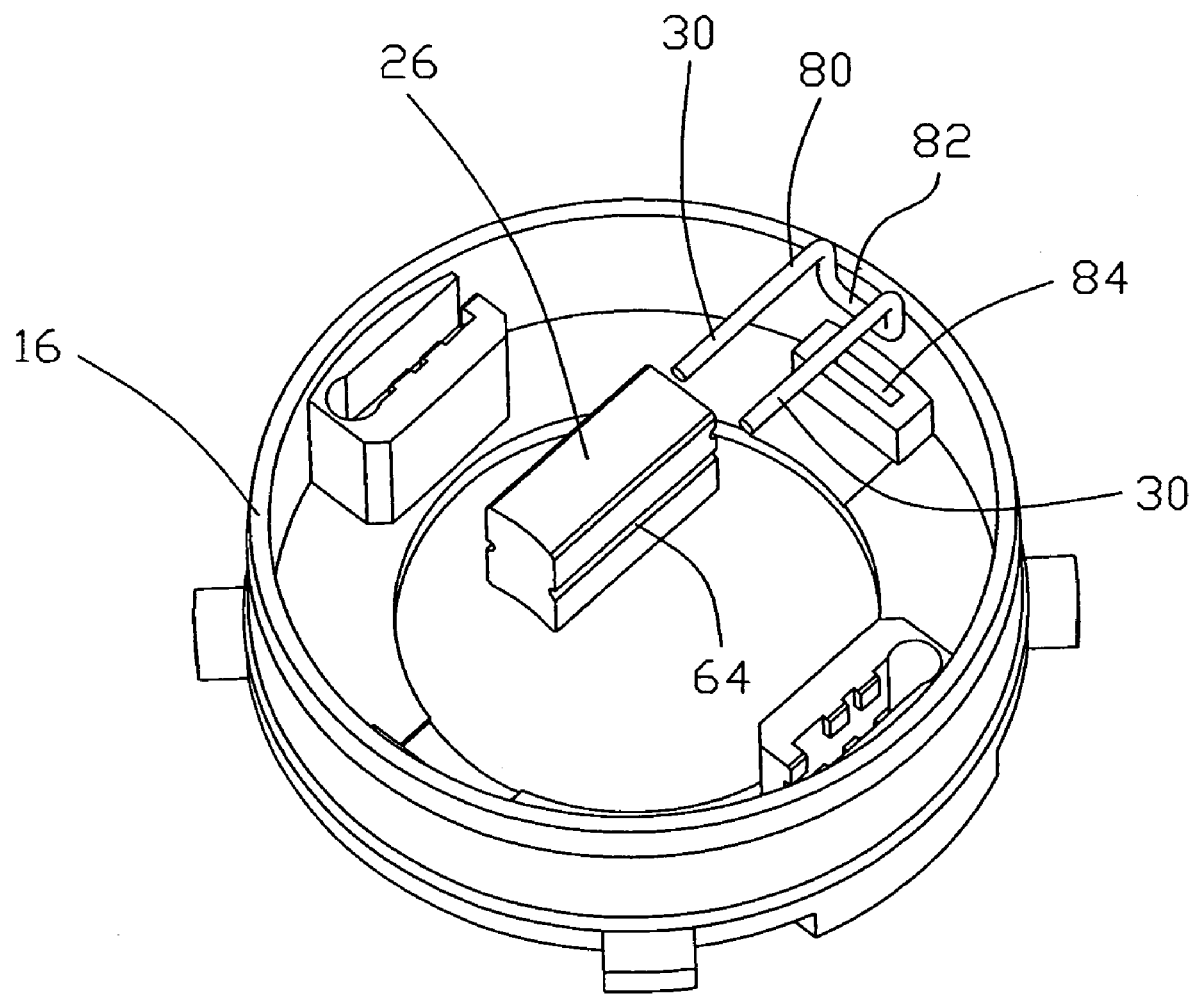
FIG. 6 illustrates an alternate brush cage assembly.

The brush assembly of FIG. 6 which is shown in partially exploded and partially assembled state, has a brush 26 with two longitudinal grooves 64. The grooves 64 allow the brush 26 to slide along two projections in the form of rails or pins 30. The projections 30 are opposite ends of a single length of wire or round stock 80 which is bent so the ends extend generally in the same direction with a middle portion 82 which is securely received in a recess 84 in the end cap. In this manner, the rails 30 guide the brush 26 towards sliding contact with a commutator of a rotor. The brush, in use, is urged into contact with the commutator by a spring (not shown) and electrical contact between the brush and a motor terminal (not shown) is by way of an embedded shunt (also not shown) and may or may not involve additional electrical components for noise suppression, such as a choke (also not shown).

Although the round stock 80 is shown as being insertable into a recess 84, the round stock 80 could be directly molded into the material of the end cap 16 to ensure a secure connection. While this may offer more freedom in the shape of the stock 80, it is a more expensive process and thus not as preferred as the embodiment illustrated.

The projections 30 or ends of the stock are described as extending generally in the same direction. This is because although ideally, the rails should run parallel with no gap between the pins and the surface of the grooves, this is not possible in reality due to manufacturing tolerances and the need for easy assembly. The rails need to allow the brush to be inserted between them easily and yet still hold the brush firmly or rigidly. This is made possible especially when the rails are in the form of pins by the resilient nature of the pins which can be resiliently deformed to widen the gap between the pins to allow insertion of the brush but yet still be rigid enough to prevent transverse or lateral movement of the brush during use, especially sidewise vibration caused by the rotation of the commutator trying to drag the brush. Problems with sliding clearance between the brush and the pins can also be overcome by utilizing the resilience of the pins. By setting the pins to be slightly convergent in their free state, the pins can be arranged to lightly grip the brush without sufficient force to significantly restrict the sliding of the brush along the pins. This removes the clearance necessary to allow the brush to slide and the additional clearance required to allow for manufacturing tolerances to avoid jamming of the brush as would occur, for example, in a cage brush assembly.

The pins may also be shaped or bent to form a divergent mouth to allow easier insertion of the brushes or to avoid sharp leading edges of the pins which may bind on the brush.

Although a replaceable brush holder is shown and preferred, the brush holder may be captured or fitted to the brush plate in a non-removable, non-replaceable manner, such as insertion barbs and overmolding.

Figure 7:
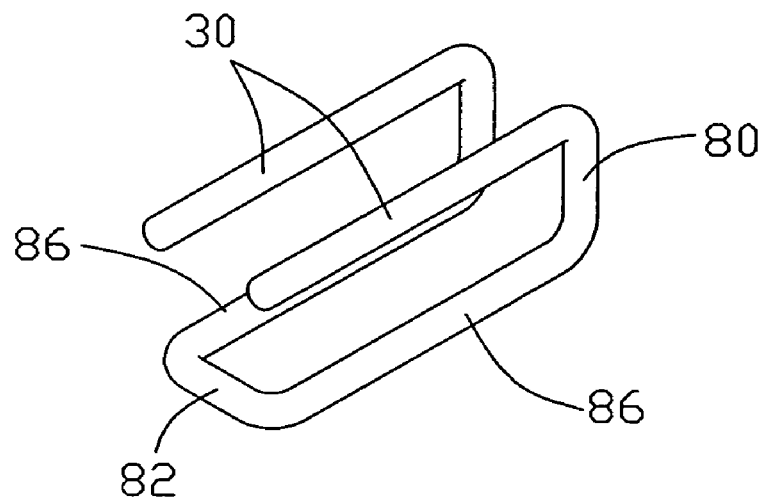
FIG. 7 is a perspective view of a pin assembly, being part of a brush assembly according to another embodiment.
Figure 8:
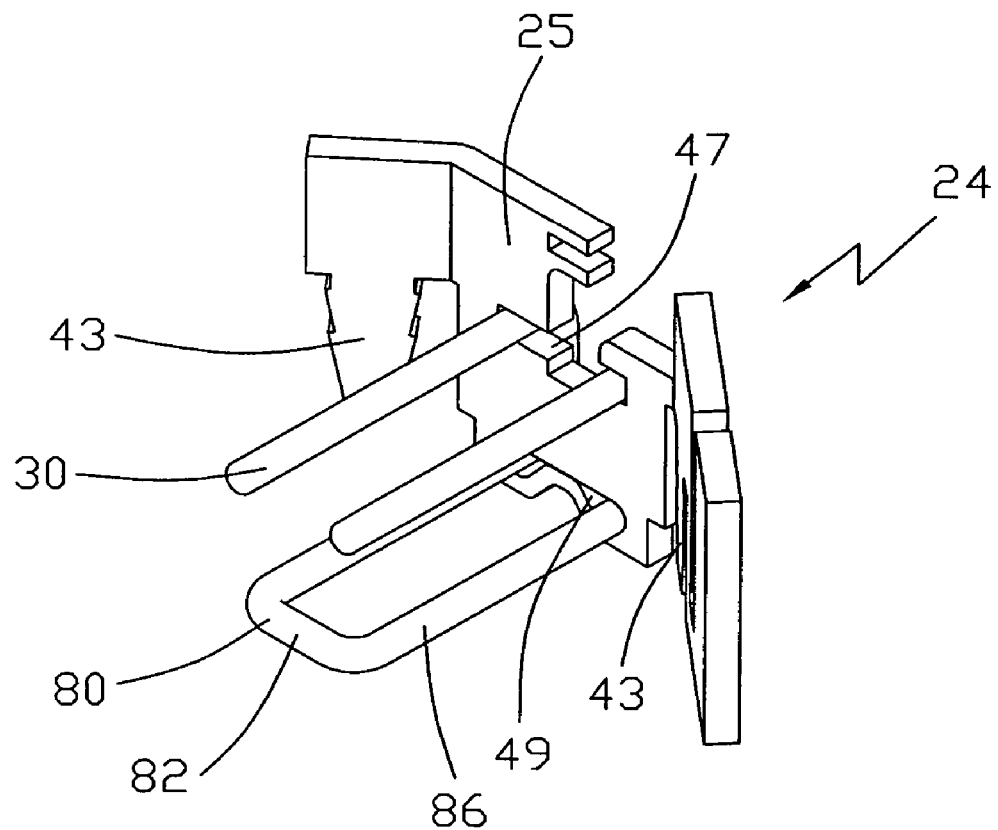
FIG. 8 illustrates a brush holder incorporating the pin assembly of FIG. 7.
Figure 9:
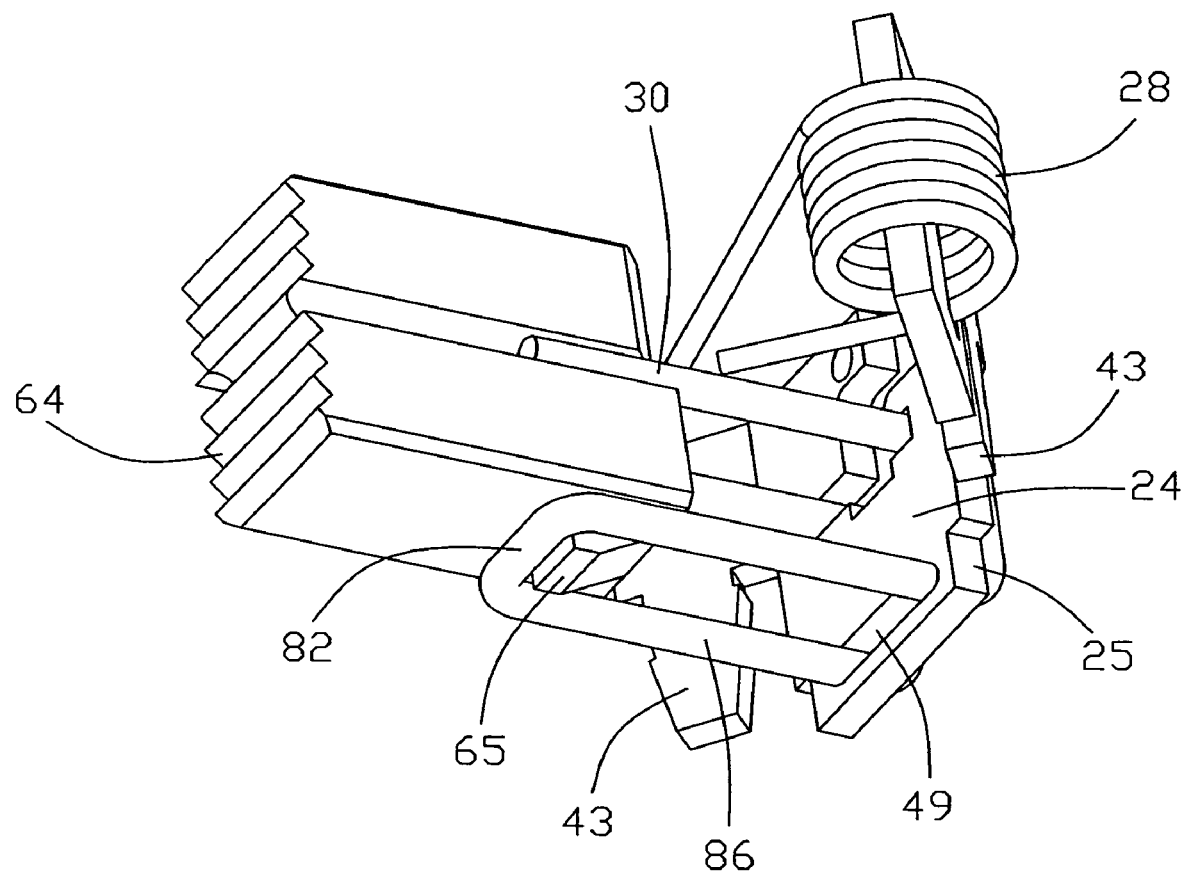
FIG. 9 illustrates a brush assembly incorporating the brush holder of FIG. 8.

The third embodiment shown in FIGS. 7 through 9 illustrates such a connection between the brush holder and the end cap.

In FIG. 7, the projections 30 are formed from a single piece of round stock or rod 80 formed into a U-shape and bent twice so that the projections lay over or adjacent the bottom of the "U" with each arm 86 also being U-shaped with projections 30 extending parallel to the first portion of the arms adjacent the bottom 82.

The brush holder 24 is similar to the brush holder of FIG. 2 except that the mounting fingers 42 are replaced by axially insertable barbed fingers 43 which are pressed into holes in a plastic brush plate or end cap to fix the brush holder in place.

The projections 30 are fixed to the brush holder by sliding the formed round stock 80 through holes and/or gaps in the brush holder. Specifically, the projections pass through an open slot 47 and the bottom of the "U" and the first portion of the arms 86 pass through another slot 49 where they are captured by crimping or otherwise deforming material of the slot 49 onto the arms 86. By crimping the first portion of the arms 86 and not the projections 30, reduces the likelihood of altering the position of the projections during fixing.

The first portion of the arms 86 and the bottom of the "U" 82 provides a second rail for the brush to sit on, giving added support or stiffness in the axial direction of the motor. This also provides a convenient stop for a brush stop detent.

As shown in FIG. 9, which illustrates the brush assembly, a stop 65 is formed on the lower surface of the brush towards the back end of the brush. The stop 65 moves along and in between the first portion of the arms 86 until it reaches the bottom 82 of the "U". When it engages the bottom 82, it prevents further movement of the brush 26 away from the brush holder 24 under the influence of the spring 28. The brush stop is used to prevent the brush from wearing too short resulting in either rubbing of an embedded shunt on the commutator or dislodgment of the brush from the brush holder, at the end of brush life.

Figure 10:
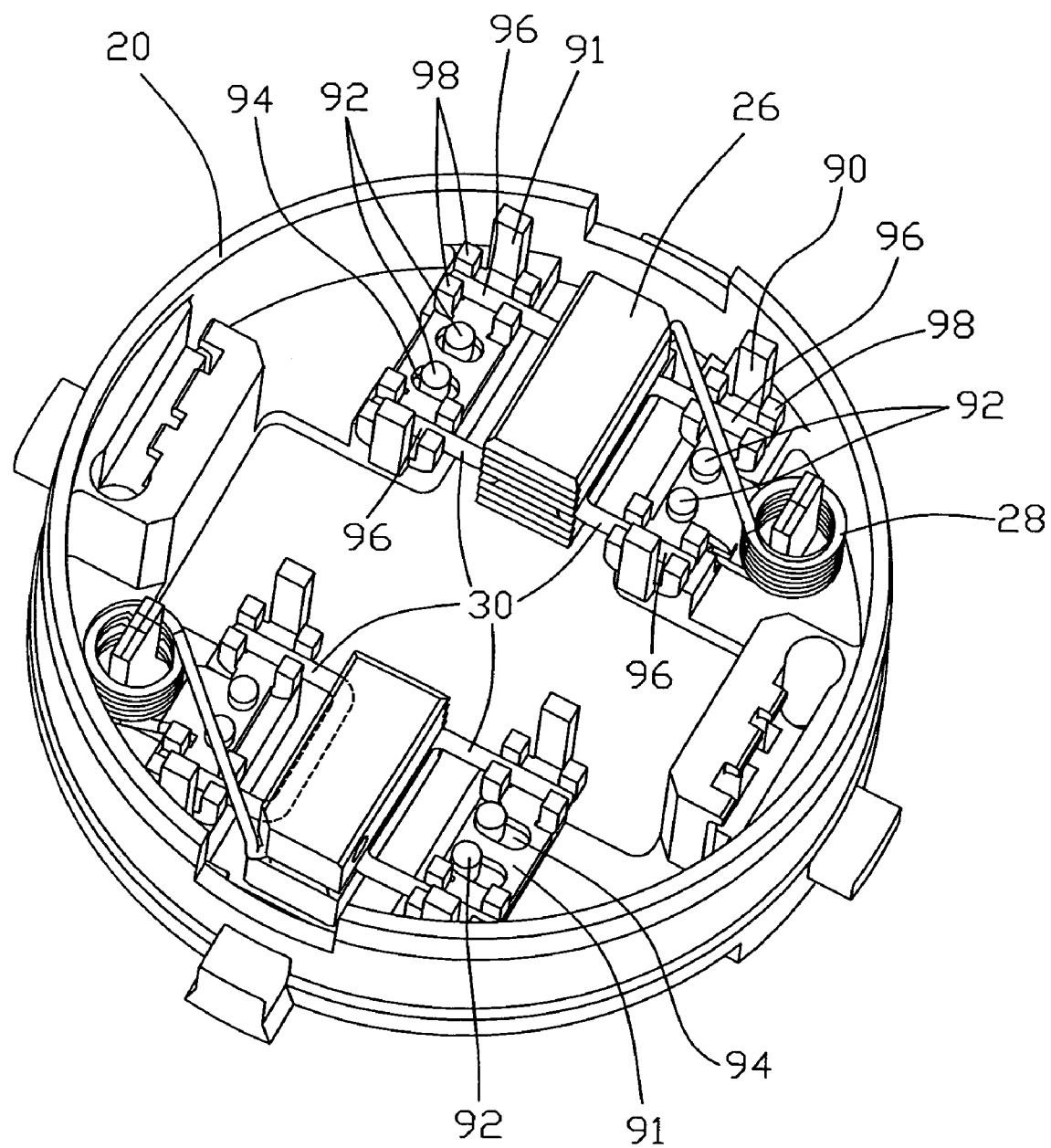
FIG. 10 is an inside view of a motor brush plate incorporating two brush assemblies according to a fourth embodiment.

FIG. 10 illustrates a fourth embodiment fitted to a plastic end cap or brush plate 20. In this embodiment, the rail projections 30 are round stock formed into a U-shape with the arms crimped to respective individual support plates 90, 91. The support plates 90, 91 are fixed to the brush plate 20 by plastic deformation of fixing projections 92 passing through locating holes. One support plate 90 has locating holes which are sized to receive the fixing projections 92 while the other support plate 91 has slotted holes 94 for receiving the fixing projections 92 to allow for adjusting the gap between the rail projections 30 to compensate for tolerances on the dimensions of the brush 26. The rail projections are fixed to the supporting plates 90, 91 by the arms 96 of the U-shape so that the base of the "U" forms the rail on which the brush 26 slides. Crimping is achieved by forming four posts 98 around each end of the arms 96, preferably by stamping the support plate 90, 91. Once the arms 96 of the rails have been placed between the posts 98, the posts are squeezed or otherwise plastically deformed to capture the rails. The first support plate 90 also supports the brush spring 28. The brush shunt is omitted for simplicity but would electrically connect the brush directly to a motor terminal or to another component, e.g., a noise suppression component of the motor.

With the rails 30 formed in this manner, the ends of the projections/pins do not need special treatment to remove burrs as the end do not contact the brush.

Thus, the present invention provides a brush assembly which is relatively easy to produce, has a stable brush position and yet the brush is almost completely exposed allowing cooling air to flow unimpeded around the sides of the brush.

The embodiments described above are given by way of example only and various modifications will be apparent to persons skilled in the art without departing from the scope of the invention as defined in the appended claims. For example, although round pins and semicircular grooves are shown, other cross-sectional shapes may be used as desired to restrict movement to the sliding direction and to reduce contact area, to reduce sliding friction or to improve manufacturability. For example, round or rectangular pins with triangular grooves, hexagonal or elliptical rails with square grooves.

Although the preferred embodiment uses a sheet metal holder with pressed in rail or pin projections, a favorable construction could be a one piece molded or forged arrangement for the holder and projections. This gives greater freedom in the design of the projections and in strengthening of the projection/holder connection. Metal casting or forging such as brass, copper alloy and aluminum alloy, and plastic and ceramic molding may be suitable.

The invention claimed is:

1. A brush assembly for an electric motor, the brush assembly comprising:
   a brush for making sliding contact with a commutator;
   a spring for resiliently urging the brush into contact with the commutator; and
   a holder for supporting the brush and guiding the brush towards the commutator, the holder having a base and a plurality of self supporting projections extending from the base for solely supporting and guiding the brush,
   wherein sides of said brush are uncovered for airflow where not covered by said projections;
   wherein the projections form rails and the brush has a plurality of grooves in which the rails are received for guiding and supporting the brush.

2. The brush assembly of claim 1 wherein there are two projections of circular cross section and the grooves in the brush are part-circular in cross section.

3. The brush assembly of claim 1, wherein the base has a central portion and first and second end portions and the projections extend generally perpendicularly from the central portion.

4. The brush assembly of claim 3, wherein the base is a stamped strip of sheet material.

5. The brush assembly of claim 4, wherein the first and second end portions are bent out of the plane of the central portion towards the side of the projections.

6. The brush assembly of claim 3, wherein the spring is a coil spring located about a post formed on the base.

7. The brush assembly of claim 6, wherein the post is formed by a transverse slot extending inwardly from an edge of the base.

8. The brush assembly of claim 7, wherein the post has a notch forming a seat for the spring.

9. The brush assembly of claim 3, wherein the central portion has a cut-out through which an arm of the spring extends to bear against a rear face of the brush.

10. The brush assembly of claim 9, wherein the central portion has a limb extending partially across the cut-out, the limb has a slotted distal end for holding the arm of the spring in a retracted position in which it does not contact the rear face of the brush.

11. The brush assembly of claim 3, wherein the first end portion of the base is adapted to electrically connect the brush shunt to a motor terminal connection.

12. The brush assembly of claim 11, wherein the motor terminal connection is a motor lead wire.

13. The brush assembly of claim 12, wherein the base is conductive and the lead wire is welded to the first end portion.

14. The brush assembly of claim 13, wherein the first end portion is slotted forming a plurality of terminal fingers and the lead wire is welded to at least one of the terminal fingers.

15. The brush assembly of claim 14, wherein the terminal fingers extend in the longitudinal direction of the base and the shunt wire and lead wire are welded to separate terminal fingers.

16. The brush assembly of claim 1, wherein the brush assembly is adapted to be releasably attached to a brush plate of the motor.

17. The brush assembly of claim 16, wherein the brush assembly is releasably attached to the brush plate by snap fit mounting arms which extend in a direction transverse to the axial direction of a shaft of the motor.

18. The brush assembly of claim 17, wherein the mounting arms extend from and are integral with the central portion of the base, the arms extending substantially parallel to the projections and are received in mounting slots formed on the brush plate.

19. The brush assembly of claim 18, wherein the mounting arms have a barb on the distal end, the barb having a forward facing tapered surface and a rear facing shoulder which when the brush assembly is fully inserted, bears against an abutment wall at the end of the mounting slots to prevent withdrawal of the mounting arms.

20. The brush assembly of claim 19, wherein the distal end of each mounting arm has a slot to allow the end to be resiliently deformed during insertion of the mounting arm and to be resiliently deformed to allow removal of the mounting arm.

21. The brush assembly of claim 20, wherein the motor has a window in a housing through which window the brush assembly is passed to be installed or removed from the brush plate.

22. The brush assembly of claim 21, wherein the brush plate is at least a part of the end cap and the end cap including the brush plate has apertures allowing external access to the distal ends of the mounting arms for resiliently deforming the arms to allow the brush assembly to be removed from the motor.

23. The brush assembly of claim 1, wherein the base has mounting arms which are adapted to engage an insulating brush plate of the motor.

24. The brush assembly of claim 1, wherein the base is an integral part of a brush plate of the motor.

25. The brush assembly of claim 24, wherein the brush plate is a molded plastic part and the projections are molded into the brush plate.

26. The brush assembly of claim 24, wherein the projections are respective ends of a single rod.

27. The brush assembly of claim 1, wherein the base and the projections are integrally formed as a monolithic construction and the projections form rails cantilevering from the holder and the brush is adapted to slide along the rails under the influence of the spring.

28. A PMDC motor incorporating at least two brush assemblies as defined in claim 1.

29. The brush assembly of claim 1, wherein said brush has a first end, a second end, and at least one side, said first end making sliding contact with said commutator, said second end being in contact with said spring, said sides being in contact with said projections and uncovered except for said projections.

30. A brush assembly for an electric motor, the brush assembly comprising:
  a brush for making sliding contact with a commutator;
  a spring for resiliently urging the brush into contact with the commutator; and
  a holder for supporting the brush and guiding the brush towards the commutator, the holder having a base and two projections extending from the base for supporting and guiding the brush,
  wherein the projections form rails and the brush has two grooves in which the rails are received for guiding and supporting the brush;
  the two projections being respective ends of a single rod and the rod has a substantially U-shaped middle portion forming a bottom with two arms extending therefrom.

31. The brush assembly of claim 30, wherein the bottom is securely received in a recess in a brush plate of the motor.

32. The brush assembly of claim 31, wherein the recess receives the U-shaped middle portion of the rod in a motor axial direction and the rod is further bent so that the projections extend in a direction perpendicular to the motor axial direction.

33. The brush assembly of claim 30, wherein the arms are U-shaped forming first and second arm portions which extend substantially perpendicularly from the base with the brush slidable along the projections being the free ends of the second portions of the arms and being proximate to the first portion of the arms and the bottom.

34. The brush assembly of claim 33, wherein the brush slidably rests on the first portion of the arms.

35. The brush assembly of claim 33, wherein the brush has a stop projection located between the first portion of the arms and interfering with the bottom to limit movement of the brush away from the base.

36. The brush assembly of claim 33, wherein the rod extends through slots in the base and is fixed to the base by plastic deformation of the slot receiving the first portion of the arms.

37. The brush assembly of claim 36, wherein the first portion of the arms are fixed to the base with the middle section of the arms located on an opposite side of the base to the distal ends of the projections and the bottom of the "U".

38. The brush assembly of claim 33, wherein the bottom of the "U" is proximate the distal ends of the projections.

39. A brush assembly for an electric motor, the brush assembly comprising:
  a brush for making sliding contact with a commutator;
  a spring for resiliently urging the brush into contact with the commutator; and
  a holder for supporting the brush and guiding the brush towards the commutator, the holder having first and second bases and a plurality of projections extending from the bases for supporting and guiding the brush,
  wherein the projections form rails and the brush has a plurality of grooves in which the rails are received for guiding and supporting the brush;
  the projections being separate U-shaped rods extending from respective said first and second bases located on opposite lateral sides of the brush.

40. The brush assembly of claim 39, wherein the first base supports the brush spring.

41. The brush assembly of claim 39, wherein the first base is precisely fixed to the brush plate and the second base is fixed to the brush plate within a given range of lateral movement to compensate for tolerances in brush dimensions.

42. The brush assembly of claim 39, wherein the bottom of the "U" forms the rail which locates in the groove in the brush.

43. The brush assembly of claim 39, wherein the flee ends of the U-shape projections are crimped to the respective base.

44. A brush assembly for an electric motor, the brush assembly comprising:
  a brush for making sliding contact with a commutator;
  a spring for resiliently urging the brush into contact with the commutator; and
  a holder for supporting the brush and guiding the brush towards the commutator, the holder having a base and a plurality of self supporting projections extending from the base for solely supporting and guiding the brush,
  wherein sides of said brush are uncovered for airflow where not covered by said projections;
  wherein first projections form rails and the brush has a plurality of grooves in which the rails are received for guiding and supporting the brush, and second projections form a U-shaped bottom.

* * * * *